(12) United States Patent
Lee

(10) Patent No.: US 12,224,672 B2
(45) Date of Patent: Feb. 11, 2025

(54) ASYMMETRIC POWER CONVERTER

(71) Applicant: CHICONY POWER TECHNOLOGY CO., LTD., New Taipei (TW)

(72) Inventor: Min-Han Lee, New Taipei (TW)

(73) Assignee: CHICONY POWER TECHNOLOGY CO., LTD., New Taipei (TW)

(*) Notice: Subject to any disclaimer, the term of this patent is extended or adjusted under 35 U.S.C. 154(b) by 239 days.

(21) Appl. No.: 18/174,193

(22) Filed: Feb. 24, 2023

(65) Prior Publication Data
US 2024/0195311 A1 Jun. 13, 2024

(30) Foreign Application Priority Data

Dec. 9, 2022 (TW) .................................. 111147367

(51) Int. Cl.
*H02M 3/335* (2006.01)
*H02M 1/00* (2006.01)
*H02M 1/42* (2007.01)

(52) U.S. Cl.
CPC ..... *H02M 3/33573* (2021.05); *H02M 1/0064* (2021.05); *H02M 1/4225* (2013.01); *H02M 3/33523* (2013.01)

(58) Field of Classification Search
CPC .......... H02M 3/33573; H02M 1/0064; H02M 1/4225; H02M 3/33523
See application file for complete search history.

(56) References Cited

U.S. PATENT DOCUMENTS

| 6,275,397 B1* | 8/2001 | McClain ............. H02M 1/4225 363/37 |
| 10,389,233 B1* | 8/2019 | Lim .................... H02M 1/4266 |
| 2006/0133119 A1 | 6/2006 | Nomura et al. |

(Continued)

FOREIGN PATENT DOCUMENTS

| CN | 102664531 B | 11/2014 |
| CN | 104467443 A | 3/2015 |

(Continued)

OTHER PUBLICATIONS

Office Action dated Jan. 24, 2024 of the corresponding Taiwan patent application No. 111147367.

*Primary Examiner* — Adolf D Berhane
*Assistant Examiner* — Afework S Demisse
(74) *Attorney, Agent, or Firm* — MUNCY, GEISSLER, OLDS & LOWE, P.C.

(57) ABSTRACT

An asymmetric power converter includes a primary-side rectifying/filtering circuit, a power factor correction circuit, an asymmetric conversion circuit, and a feedback control circuit. The primary-side rectifying/filtering circuit rectifies and filters an input voltage to output a first voltage. The power factor correction circuit converts the first voltage into a power voltage. The asymmetric conversion circuit converts the power voltage into an output voltage to supply power to a load, and an output current is drawn by the load. The feedback control circuit generates a feedback control signal according to a load power demand provided by the load. The feedback control circuit controls the asymmetric conversion circuit to operate in a full-bridge resonant mode, a half-bridge resonant mode, or a hybrid half-bridge resonant mode according to the feedback control signal.

18 Claims, 9 Drawing Sheets

(56) References Cited

U.S. PATENT DOCUMENTS

| | | | |
|---|---|---|---|
| 2007/0273322 A1 | 11/2007 | Ramu | |
| 2015/0098254 A1 | 4/2015 | Brinlee et al. | |
| 2015/0162840 A1 | 6/2015 | Frost et al. | |
| 2022/0286045 A1* | 9/2022 | Peng | H02M 1/385 |

FOREIGN PATENT DOCUMENTS

| | | |
|---|---|---|
| CN | 108258910 A | 7/2018 |
| CN | 110504847 A | 11/2019 |
| CN | 112737343 A | 4/2021 |
| CN | 113452260 A | 9/2021 |
| CN | 114285113 A | 4/2022 |
| CN | 217508617 U | 9/2022 |
| CN | 115443603 A | 12/2022 |
| TW | 200529543 A | 9/2005 |
| TW | 200529563 A | 9/2005 |
| TW | 201027892 A | 7/2010 |
| TW | 202130101 A | 8/2021 |
| TW | 202145688 A | 12/2021 |

\* cited by examiner

ASYMMETRIC POWER CONVERTER

BACKGROUND

Technical Field

The present disclosure relates to an asymmetric power converter, and more particularly to an asymmetrical power converter operable in a full-bridge resonant mode, a half-bridge resonant mode, or a hybrid half-bridge resonant mode.

Description of Related Art

The statements in this section merely provide background information related to the present disclosure and do not necessarily constitute prior art.

In power delivery (PD) applications, due to the voltage gain ratio Vo/Vin=D/N of traditional asymmetric half-bridge forward and flyback power converters, it is not conducive to the application of wide voltage range and wide wattage range. In other words, it is difficult to provide the best power conversion performance in response to the different output requirements of high wattage and low wattage, and to increase the conversion efficiency by reducing the switching loss of lower wattage.

SUMMARY

An objective of the present disclosure is to provide an asymmetric power converter to solve the problems of existing technology.

In order to achieve the above-mentioned objective, the asymmetric power converter includes a primary-side rectifying/filtering circuit, a power factor correction circuit, an asymmetric conversion circuit, and a feedback control circuit. The primary-side rectifying/filtering circuit receives an input voltage, and rectifies and filters the input voltage into a first voltage. The power factor correction circuit receives the first voltage, and converts the first voltage into a power voltage. The asymmetric conversion circuit receives the power voltage, and converts the power voltage into an output voltage to supply power to a load, and an output current is drawn by the load. The feedback control circuit is coupled to the asymmetric conversion circuit, and generates a feedback control signal according to a load power demand provided by the load. The load power demand includes information of the output voltage and information of the output current. The feedback control circuit controls the asymmetric conversion circuit to operate in a full-bridge resonant mode, a half-bridge resonant mode, or a hybrid half-bridge resonant mode according to the feedback control signal.

In one embodiment, the power factor correction circuit includes a first switch, a first inductor, a first diode, a first capacitor, and a resistor. A first end of the first switch is coupled to a first end of the first voltage. A first end of the first inductor is coupled to a second end of the first switch, and a second end of the first inductor is coupled to a second end of the first voltage. A first end of the first diode is coupled to the first end of the first inductor. A first end of the first capacitor is coupled to a second end of the first diode, and a second end of the first capacitor is coupled to the second end of the first inductor. A first end of the first resistor is coupled to the first end of the first capacitor, and a second end of the first resistor is coupled to the second end of the first capacitor. The first switch is controlled to switching according to the switching frequency so as to convert the first voltage into the power voltage.

In one embodiment, the power factor correction circuit includes a first inductor, a first switch, a first diode, a first capacitor, and a first resistor. A first end of the first inductor is coupled to a first end of the first voltage. A first end of the first switch is coupled to a second end of the first inductor, and a second end of the first switch is coupled to a second end of the first voltage. A first end of the first diode is coupled to the first end of the first switch. A first end of the first capacitor is coupled to a second end of the first diode, and a second end of the first capacitor is coupled to the second end of the first resistor. A first end of the first resistor is coupled to the first end of the first capacitor, and a second end of the first resistor is coupled to the second end of the first capacitor. The first switch is controlled to switching according to the switching frequency so as to convert the first voltage into the power voltage.

In one embodiment, the asymmetric conversion circuit includes a primary-side isolation circuit and a secondary-side isolation circuit. The primary-side isolation circuit receives the feedback control signal and the power voltage. The secondary-side isolation circuit converts the power voltage into the output voltage.

In one embodiment, the primary-side isolation circuit includes a bridge synchronous rectification circuit. The secondary-side isolation circuit includes a bridge switching circuit and a resonant circuit.

In one embodiment, the bridge synchronous rectification circuit includes a first switch, a second switch, a third switch, a fourth switch, a first resonant inductor, a first resonant capacitor, and a second resonant inductor. A first end of the second switch is coupled to a second end of the first switch. A first end of the third switch is coupled to a first end of the first switch. A first end of the fourth switch is coupled to a second end of the third switch, and a second end of the fourth switch is coupled to a second end of the second switch. The first resonant capacitor is coupled to the first resonant inductor in series to form a series-connected branch, and a first end of the series-connected branch is coupled to the second end of the first switch and the first end of the second switch. A first end of the second resonant inductor is coupled to a second end of the series-connected branch, and a second end of the second resonant inductor is coupled to the second end of the third switch and the first end of the fourth switch. The feedback control circuit controls the first switch, the second switch, the third switch, and the fourth switch according to the feedback control signal.

In one embodiment, the bridge switching circuit includes an upper switch. The resonant circuit includes a capacitor and a resistor to form a parallel-connected branch, and the parallel-connected branch is coupled to the upper switch.

In one embodiment, when the output voltage is greater than a threshold voltage, the asymmetric conversion circuit operates in the full-bridge resonant mode. The first switch and the fourth switch are simultaneously turned on or turned off, the second switch and the third switch are simultaneously turned on or turned off, and the first switch and the second switch are complementy switched so as to convert the power voltage into the output voltage.

In one embodiment, the first switch and the fourth switch are first turned on, and then the second switch and the third switch are turned on, and the operation is continuously repeated to form a flyback conversion operation.

In one embodiment, the second switch and the third switch are first turned on, and then the first switch and the fourth switch are turned on, and the operation is continuously repeated to form a forward conversion operation.

In one embodiment, when the output voltage is less than a threshold voltage and the output current is less than a threshold current, the asymmetric conversion circuit operates in the half-bridge resonant mode. The first switch and the second switch are complemently switched, and the third switch and the fourth switch are complemently turned on and turned off so as to convert the power voltage into the output voltage; or the first switch and the second switch are complemently turned on and turned off, and the third switch and the fourth switch are complemently switched so as to convert the power voltage into the output voltage.

In one embodiment, the first switch is first turned on, and then the second switch is switched on to be complemently switched, and the third switch is turned on and the fourth switch is turned off, and the operation is continuously repeated to form a flyback conversion operation.

In one embodiment, the fourth switch is first turned on, and then the third switch is switched on to be complemently switched, and the first switch is turned on and the second switch is turned off, and the operation is continuously repeated to form a flyback conversion operation.

In one embodiment, the second switch is first turned on, and then the first switch is switched on to be complemently switched, and the third switch is turned on and the fourth switch is turned off, and the operation is continuously repeated to form a forward conversion operation.

In one embodiment, the third switch is first turned on, and then the fourth switch is switched on to be complemently switched, and the second switch is turned on and the first switch is turned off, and the operation is continuously repeated to form a forward conversion operation.

In one embodiment, when the output voltage is less than a threshold voltage and the output current is greater than a threshold current, the asymmetric conversion circuit operates in the hybrid half-bridge resonant mode. The first switch and the second switch are partially complemently switched and partially complemently turned on and turned off, and the third switch and the fourth switch are correspondingly partially complemently turned on and turned off and correspondingly partially complemently switched to convert the power voltage into the output voltage.

In one embodiment, the first switch and the second switch are first complemently switched and then complemently turned on and turned off, and the third switch and the fourth switch are correspondingly first complemently turned on and turned off and then correspondingly complemently switched, and the operation is continuously repeated to form a flyback conversion operation.

In one embodiment, the third switch and the fourth switch are first complemently switched and then complemently turned on and turned off, and the first switch and the second switch are correspondingly first complemently turned on and turned off and then correspondingly complemently switched, and the operation is continuously repeated to form a forward conversion operation.

Accordingly, the present disclosure has the following features and advantages: 1. According to the output voltage and output current, the feedback control circuit controls the asymmetric conversion circuit to operate in the full-bridge resonant mode, the half-bridge resonant mode, or the hybrid half-bridge resonant mode according to the feedback control signal; 2. By operating in the different operation modes achieves the required voltage gain ratio, and the conversion between high wattage and low wattage requirements, thereby increasing the operation cycle range; 3. The full-bridge mode is used at higher wattages, and the half-bridge mode is used at lower wattages to reduce switching losses at lower wattages; 4. Uniform distribution of switching losses can be implemented by operating the asymmetric conversion circuit in the half-bridge resonant mode and the hybrid half-bridge resonant mode.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
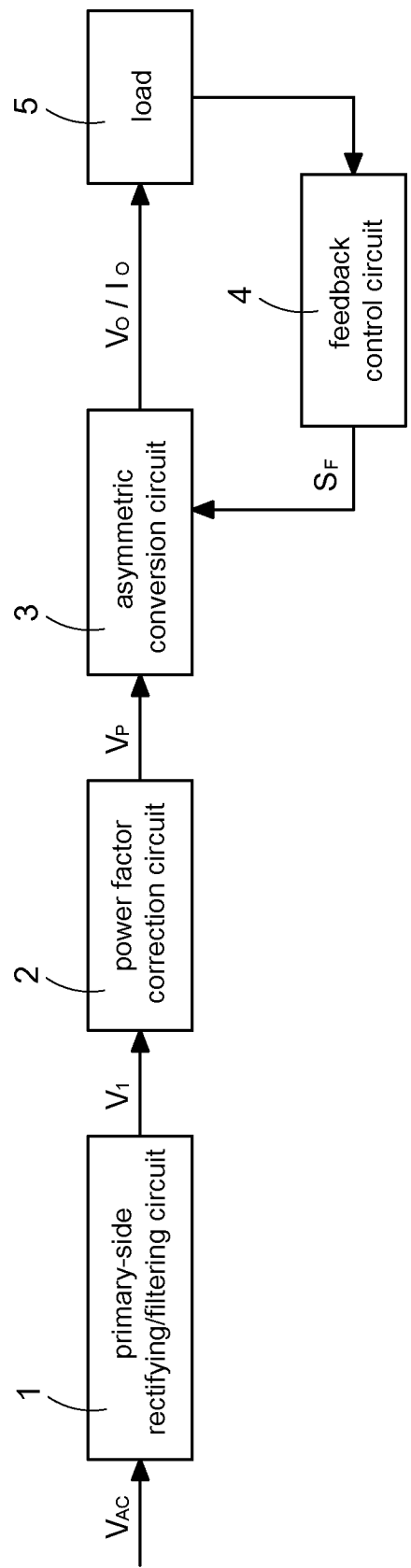
FIG. 1 is an architecture block diagram of an asymmetric power converter according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows an architecture block diagram of an asymmetric power converter according to the present disclosure. The asymmetric power converter includes a primary-side rectifying/filtering circuit 1, a power factor correction circuit 2, an asymmetric conversion circuit 3, and a feedback control circuit 4.

The primary-side rectifying/filtering circuit 1 rectifies and filters an input voltage $V_{AC}$ into a first voltage $V_1$. The power factor correction circuit 2 is coupled to the primary-side rectifying/filtering circuit 1, and receives the first voltage $V_1$ and converts the first voltage $V_1$ into a power voltage $V_P$.

The asymmetric conversion circuit 3 is coupled to the power factor correction circuit 2, and receives the power voltage $V_P$ and converts the power voltage $V_P$ into an output voltage $V_O$ to supply power to a load 5. Therefore, the load 5 is supplied power by the output voltage $V_O$ and an output current $I_O$ is drawn by the load 5. For example, the output current $I_O$ of 2 amps is drawn.

The feedback control circuit 4 is coupled to the asymmetric conversion circuit 3, and generates a feedback control signal $S_F$ according to a load power demand provided by the load 5. In particular, the load power demand includes information of the output voltage $V_O$ and information of the output current $I_O$. Specifically, the load 5 may feed back the magnitude of the supplied output voltage $V_O$ and the drawn output current $I_O$ to the feedback control circuit 4. Therefore, the feedback control circuit 4 provides the feedback control signal $S_F$ including the information of the output voltage $V_O$ and the information of the output current $I_O$ to the asymmetric conversion circuit 3.

Therefore, the feedback control circuit 4 controls the asymmetric conversion circuit 3 to operate in a full-bridge resonant mode, a half-bridge resonant mode, or a hybrid half-bridge resonant mode according to the feedback control signal $S_F$. Various operation modes will be described in more detail later.

Figure 2B:
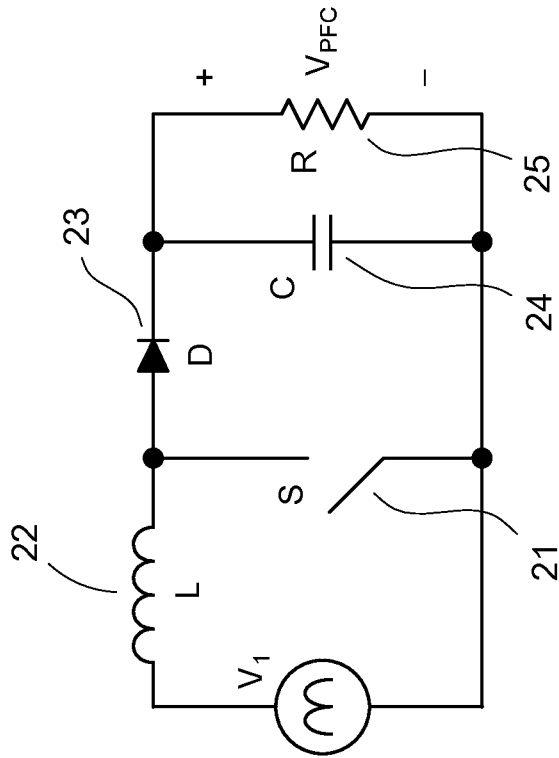
FIG. 2B is a circuit diagram of the power factor correction circuit according to a second embodiment of the present disclosure.
Figure 2A:
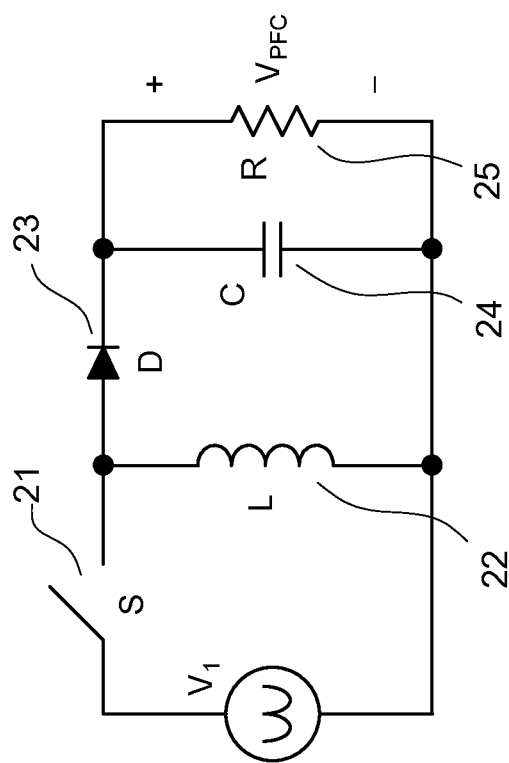
FIG. 2A is a circuit diagram of a power factor correction circuit according to a first embodiment of the present disclosure.

Please refer to FIG. 2A, which shows a circuit diagram of a power factor correction circuit according to a first embodiment of the present disclosure. In the first embodiment, components of the power factor correction circuit 2 correspond to one waveform (polarity) design of the first voltage $V_1$. Specifically, the power factor correction circuit 2 includes a first switch 21, a first inductor 22, a first diode 23, a first capacitor 24, and a first resistor 25. A first end of the first switch 21 is coupled to a first end of the first voltage $V_1$. A first end of the first inductor 22 is coupled to a second end of the first switch 21, and a second end of the first inductor 22 is coupled to a second end of the first voltage $V_1$. A first end of the first diode 23 is coupled to the first end of the first inductor 22. A first end of the first capacitor 24 is coupled to a second end of the first diode 23, and a second end of the first capacitor 24 is coupled to the second end of the first inductor 22. A first end of the first resistor 25 is coupled to the first end of the first capacitor 24, and a second end of the first resistor 25 is coupled to the second end of the first capacitor 24. The first switch 21 is controlled to switching according to the switching frequency so as to convert the first voltage $V_1$ into the power voltage $V_P$.

Please refer to FIG. 2B, which shows a circuit diagram of the power factor correction circuit according to a second embodiment of the present disclosure. Compared with the embodiment of FIG. 2A, in the second embodiment, components of the power factor correction circuit 2 correspond to another waveform (polarity) design of the first voltage $V_1$. Specifically, the power factor correction circuit 2 includes a first inductor 22, a first switch 21, a first diode 23, a first capacitor 24, and a first resistor 25. A first end of the first inductor 22 is coupled to a first end of the first voltage $V_1$. A first end of the first switch 21 is coupled to a second end of the first inductor 22, and a second end of the first switch 21 is coupled to a second end of the first voltage $V_1$. A first end of the first diode 23 is coupled to the first end of the first switch 21. A first end of the first capacitor 24 is coupled to a second end of the first diode 23, and a second end of the first capacitor 24 is coupled to the second end of the first switch 21. A first end of the first resistor 25 is coupled to the first end of the first capacitor 24, and a second end of the first resistor 25 is coupled to the second end of the first capacitor 24. The first switch 21 is controlled to switching according to the switching frequency so as to convert the first voltage $V_1$ into the power voltage $V_P$.

Figure 3:
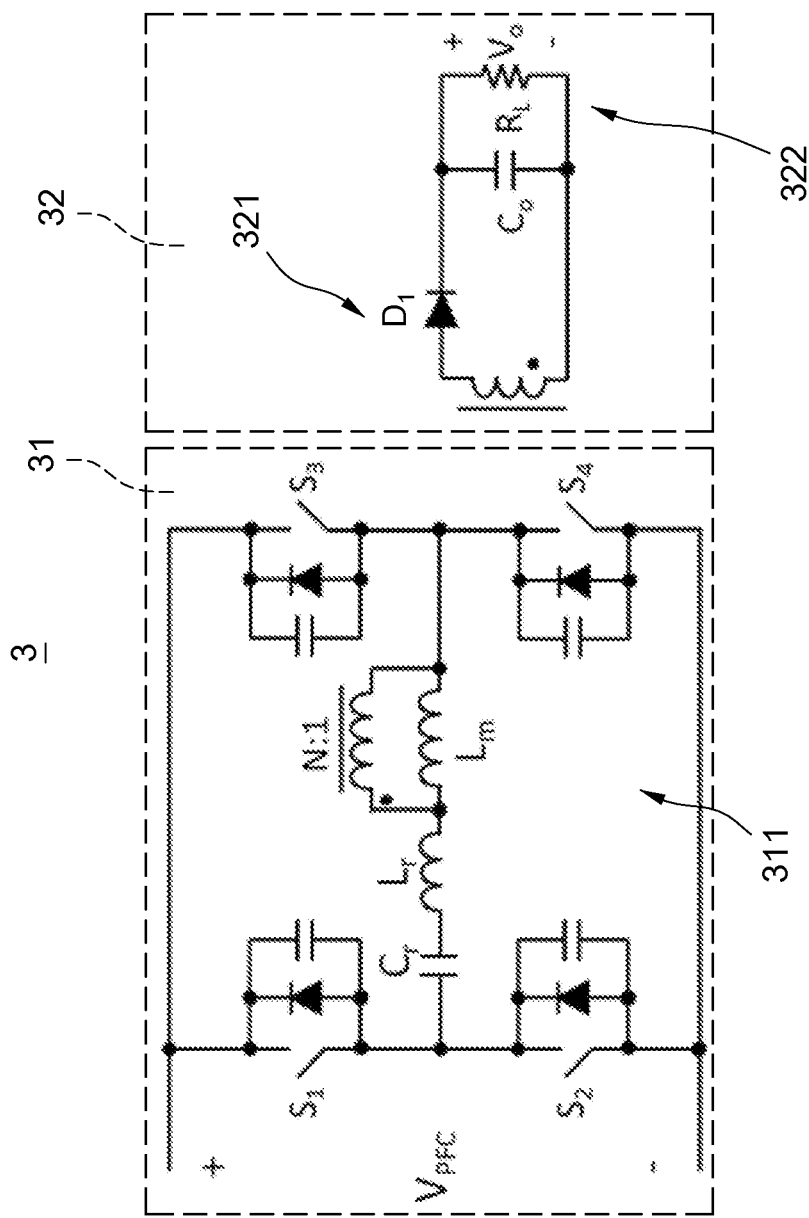
FIG. 3 is a circuit diagram of an asymmetric conversion circuit according to the present disclosure.
Figure 4A:
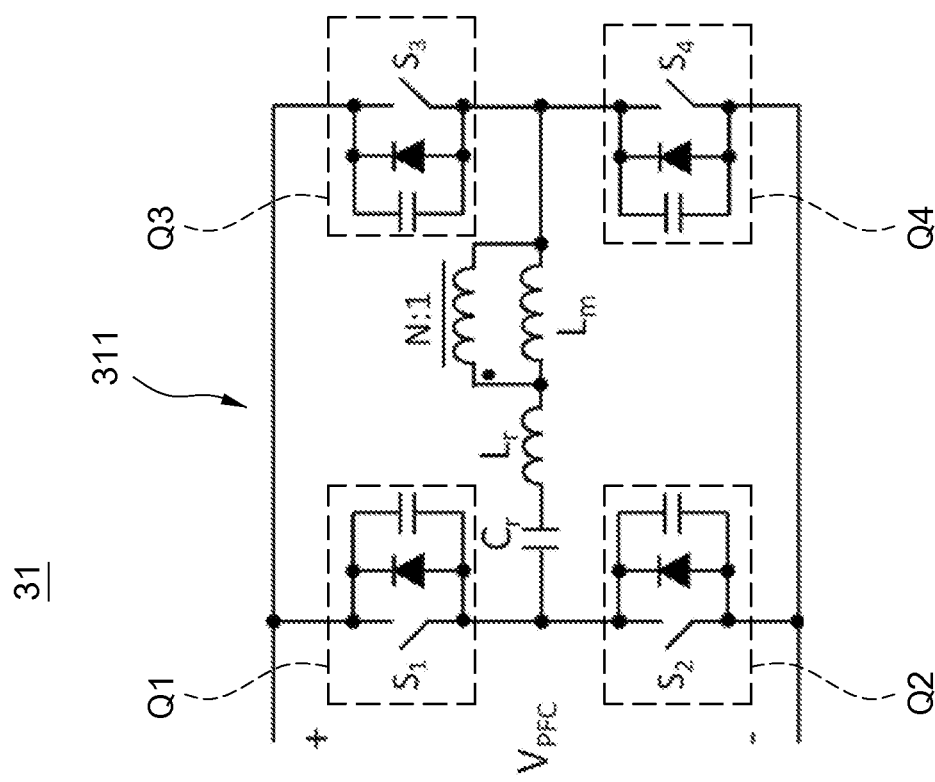
FIG. 4A is a circuit diagram of a primary-side isolation circuit of the asymmetric conversion circuit shown in FIG. 3 according to the present disclosure.
Figure 4B:
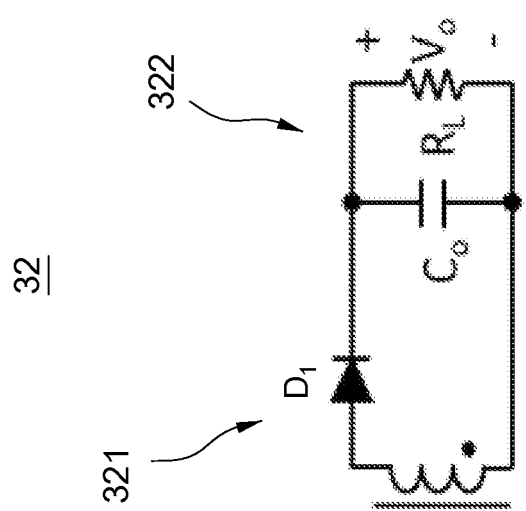
FIG. 4B is a circuit diagram of a secondary-side isolation circuit of the asymmetric conversion circuit shown in FIG. 3 according to the present disclosure.

Please refer to FIG. 3, which shows a circuit diagram of an asymmetric conversion circuit according to the present disclosure; please refer to FIG. 4A, which shows a circuit diagram of a primary-side isolation circuit of the asymmetric conversion circuit shown in FIG. 3 according to the present disclosure; please refer to FIG. 4B, which shows a circuit diagram of a secondary-side isolation circuit of the asymmetric conversion circuit shown in FIG. 3 according to the present disclosure. The asymmetric conversion circuit 3 includes a primary-side isolation circuit 31 (shown in FIG. 4A) and a secondary-side isolation circuit 32 (shown in FIG. 4B). The primary-side isolation circuit 31 includes a bridge synchronous rectification circuit 311 to receive the feedback control signal $S_F$ and the power voltage $V_P$. The secondary-side isolation circuit 32 includes a bridge switching circuit 321 and a resonant circuit 322 to convert the power voltage $V_P$ into the output voltage $V_O$.

As shown in FIG. 4A, the bridge synchronous rectification circuit 311 includes a first switch $Q_1$, a second switch $Q_2$, a third switch $Q_3$, a fourth switch $Q_4$, a first resonant inductor Lr, a first resonant capacitor Cr, and a second resonant inductor Lm. A first end of the second switch $Q_2$ is coupled to a second end of the first switch $Q_1$. A first end of the third switch $Q_3$ is coupled to a first end of the first switch $Q_1$. A first end of the fourth switch $Q_4$ is coupled to a second end of the third switch $Q_3$, and a second end of the fourth switch $Q_4$ is coupled to a second end of the second switch $Q_2$. The first resonant capacitor Cr is coupled to the first resonant inductor Lr in series to form a series-connected branch, and a first end of the series-connected branch is coupled to the second end of the first switch $Q_1$ and the first end of the second switch $Q_2$. A first end of the second resonant inductor Lm is coupled to a second end of the series-connected branch, and a second end of the second resonant inductor Lm is coupled to the second end of the third switch $Q_3$ and the first end of the fourth switch $Q_4$. The feedback control circuit 4 controls the first switch $Q_1$, the second switch $Q_2$, the third switch $Q_3$, and the fourth switch $Q_4$ according to the feedback control signal $S_F$. As shown in FIG. 4B, the bridge switching circuit 321 includes an upper switch $D_1$. The resonant circuit 322 includes a capacitor Co and a resistor Ro to form a parallel-connected branch, and the parallel-connected branch is coupled to the upper switch $D_1$.

The asymmetric conversion circuit 3 of the present disclosure operates in the full-bridge resonant mode, the half-bridge resonant mode, or the hybrid half-bridge resonant mode as follows.

When the output voltage $V_O$ is greater than a threshold voltage, the asymmetric conversion circuit 3 operates in the full-bridge resonant mode. Specifically, when the feedback control circuit 4 determines that the output voltage $V_O$ is greater than a threshold voltage, since the feedback control signal $S_F$ includes the information of the output voltage $V_O$ and the information of the output current $I_O$, the feedback control signal $S_F$ generated by the feedback control circuit 4 is used to control the asymmetric conversion circuit 3 to operate in the full-bridge resonant mode.

According to the feedback control signal $S_F$, in the full-bridge resonant mode, the feedback control circuit 4 controls the first switch $Q_1$ and the fourth switch $Q_4$ to be simultaneously turned on or turned off, the second switch $Q_2$ and the third switch $Q_3$ to be simultaneously turned on or turned off, and the first switch $Q_1$ and the second switch $Q_2$ to be complementy switched so as to convert the power voltage $V_P$ into the output voltage $V_O$. Incidentally, the feedback control circuit 4 provides a first control signal $S_1$ to control the first switch $Q_1$, provides a second control signal $S_2$ to control the second switch $Q_2$, provides a third control signal $S_3$ to control the third switch $Q_3$, and provides a fourth control signal $S_4$ to control the fourth switch $Q_4$.

Figure 5A:
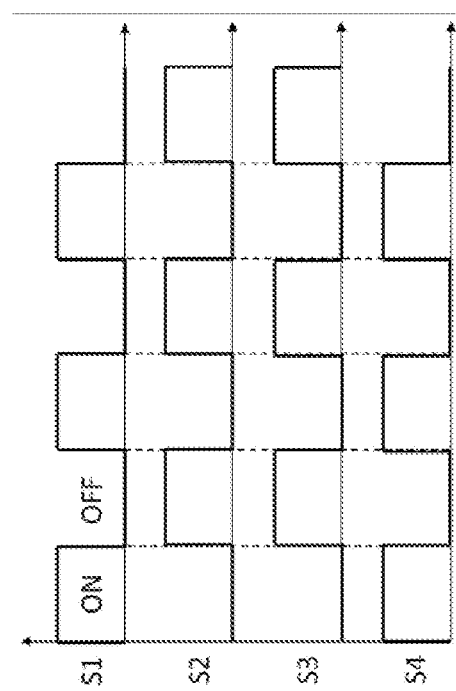
FIG. 5A is a schematic waveform of operating the asymmetric conversion circuit under a flyback conversion operation in a full-bridge resonant mode according to the present disclosure.

Please refer to FIG. 5A, which shows a schematic waveform of operating the asymmetric conversion circuit under a flyback conversion operation in a full-bridge resonant mode according to the present disclosure, and also refer to FIG. 3. Under this operation, the first switch $Q_1$ and the fourth switch $Q_4$ are first turned on, and then the second switch $Q_2$ and the third switch $Q_3$ are turned on, and the operation is continuously repeated to form a flyback conversion operation. Specifically, when the first switch $Q_1$ and the fourth switch $Q_4$ are first turned on, a current inside the bridge synchronous rectification circuit 311 flows through the first switch $Q_1$, the first resonant capacitor Cr, the first resonant inductor Lr, the second resonant inductor Lm, and the fourth switch $Q_4$. In this condition, energy is stored in the transformer (at the primary side) of the power converter.

Afterward, the second switch $Q_2$ and the third switch $Q_3$ are then turned on (the first switch $Q_1$ and the fourth switch $Q_4$ are turned off) to keep an inductor current of the transformer freewheeling. The current inside the bridge synchronous rectification circuit 311 flows through the second switch $Q_2$, the first resonant capacitor Cr, the first resonant inductor Lr, the second resonant inductor Lm, and the third switch $Q_3$. In this condition, the energy is still stored in the transformer (at the primary side) of the power converter.

Afterward, the resonance operation of the resonant components (including the first resonant inductor Lr, the first resonant capacitor Cr, and the second resonant inductor Lm) is executed to implement zero-voltage switching (ZVS) and/or zero-current switching (ZCS). Therefore, under the turning on of the second switch $Q_2$ and the third switch $Q_3$, the formed sine wave flows through the third switch $Q_3$, the second resonant inductor Lm, the first resonant inductor Lr, the first resonant capacitor Cr, and the second switch $Q_2$. In this condition, the energy stored in the transformer is transmitted to the secondary side of the transformer.

Afterward, the first switch $Q_1$ and the fourth switch $Q_4$ are then turned on (the second switch $Q_2$ and the third switch $Q_3$ are turned off) to keep the inductor current of the transformer freewheeling. The current inside the bridge synchronous rectification circuit 311 flows through the fourth switch $Q_4$, the second resonant inductor Lm, the first resonant inductor Lr, the first resonant capacitor Cr, and the first switch $Q_1$. In this condition, the energy is continuously transmitted to the secondary side of the transformer.

Figure 5B:
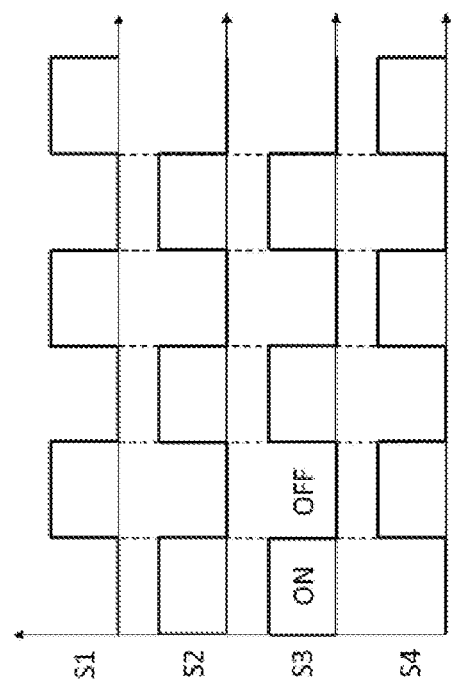
FIG. 5B is a schematic waveform of operating the asymmetric conversion circuit under a forward conversion operation in the full-bridge resonant mode according to the present disclosure.

Please refer to FIG. 5B, which shows a schematic waveform of operating the asymmetric conversion circuit under a forward conversion operation in the full-bridge resonant mode according to the present disclosure, and also refer to FIG. 3. Under this operation, the second switch $Q_2$ and the third switch $Q_3$ are first turned on, and then the first switch $Q_1$ and the fourth switch $Q_4$ are turned on, and the operation is continuously repeated to form a forward conversion operation. Specifically, when the second switch $Q_2$ and the third switch $Q_3$ are first turned on, a current inside the bridge synchronous rectification circuit 311 flows through the third switch $Q_3$, the second resonant inductor Lm, the first resonant inductor Lr, the first resonant capacitor Cr, and the second switch $Q_2$. In this condition, energy is transmitted to the secondary side of the transformer.

Afterward, the first switch $Q_1$ and the fourth switch $Q_4$ are then turned on to keep the inductor current of the transformer freewheeling. The current inside the bridge synchronous rectification circuit 311 flows through the fourth switch $Q_4$, the second resonant inductor Lm, the first resonant inductor Lr, the first resonant capacitor Cr, and the first switch $Q_1$. In this condition, the energy is continuously transmitted to the secondary side of the transformer.

Afterward, the resonance operation of the resonant components is executed to implement zero-voltage switching (ZVS) and/or zero-current switching (ZCS). Therefore, under the turning on of the first switch $Q_1$ and the fourth switch $Q_4$, the formed sine wave flows through the first switch $Q_1$, the first resonant capacitor Cr, the first resonant inductor Lr, the second resonant inductor Lm, and the fourth switch $Q_4$. In this condition, the energy is stored in the transformer (at the primary side) of the power converter.

Afterward, the second switch $Q_2$ and the third switch $Q_3$ are then turned on to keep the inductor current of the transformer freewheeling. The current inside the bridge synchronous rectification circuit 311 flows through the second switch $Q_2$, the first resonant capacitor Cr, the first resonant inductor Lr, the second resonant inductor Lm, and the third switch $Q_3$. In this condition, the energy is still stored in the transformer (at the primary side) of the power converter.

When the output voltage $V_O$ is less than the threshold voltage and the output current $I_O$ is less than a threshold current, the asymmetric conversion circuit 3 operates in the half-bridge resonant mode. According to the feedback control signal $S_F$, in the half-bridge resonant mode, the feedback control circuit 4 controls the first switch $Q_1$ and the second switch $Q_2$ to be complementy switched, and the third switch $Q_3$ and the fourth switch $Q_4$ to be complementy turned on and turned off so as to convert the power voltage $V_P$ into the output voltage $V_O$. Alternatively, the feedback control circuit 4 controls the first switch $Q_1$ and the second switch $Q_2$ to be complementy turned on and turned off, and the third switch $Q_3$ and the fourth switch $Q_4$ to be complementy switched so as to convert the power voltage $V_P$ into the output voltage $V_O$.

Figure 6A:
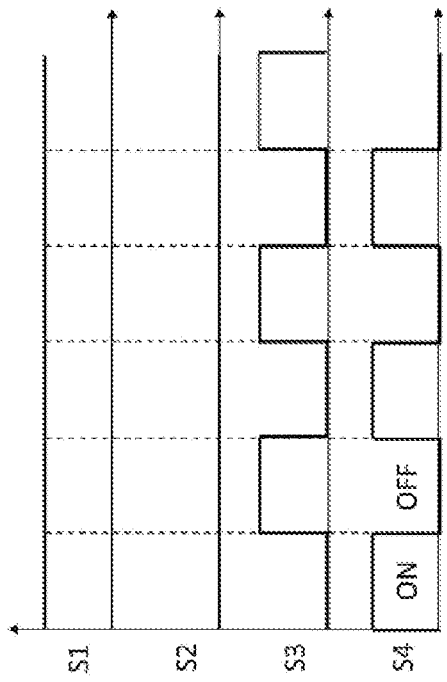
FIG. 6A is a schematic waveform of operating the asymmetric conversion circuit under the flyback conversion operation in a half-bridge resonant mode according to a first embodiment of the present disclosure.

Please refer to FIG. 6A, which shows a schematic waveform of operating the asymmetric conversion circuit under the flyback conversion operation in a half-bridge resonant mode according to a first embodiment of the present disclosure, and also refer to FIG. 3. Under this operation, the first switch $Q_1$ is first turned on, and then the second switch $Q_2$ is switched on to be complementy switched, and the third switch $Q_3$ is turned on (high level) and the fourth switch $Q_4$ is turned off (low level), and the operation is continuously repeated to form a flyback conversion operation. Specifically, when the first switch $Q_1$ and the fourth switch $Q_4$ are first turned on, a current inside the bridge synchronous rectification circuit 311 flows through the first switch $Q_1$, the first resonant capacitor Cr, the first resonant inductor Lr, the second resonant inductor Lm, and the fourth switch $Q_4$. In this condition, energy is stored in the transformer (at the primary side) of the power converter.

Afterward, the second switch $Q_2$ and the fourth switch $Q_4$ are then turned on to keep an inductor current of the transformer freewheeling. The current inside the bridge synchronous rectification circuit 311 flows through the second switch $Q_2$, the first resonant capacitor Cr, the first resonant inductor Lr, the second resonant inductor Lm, and the fourth switch $Q_4$. In this condition, the energy is still stored in the transformer (at the primary side) of the power converter.

Afterward, the resonance operation of the resonant components is executed to implement zero-voltage switching (ZVS) and/or zero-current switching (ZCS). Therefore, under the turning on of the second switch $Q_2$ and the fourth switch $Q_4$, the formed sine wave flows through the fourth switch $Q_4$, the second resonant inductor Lm, the first resonant inductor Lr, the first resonant capacitor Cr, and the second switch $Q_2$. In this condition, the energy stored in the transformer is transmitted to the secondary side of the transformer.

Afterward, the first switch $Q_1$ and the fourth switch $Q_4$ are then turned on to keep the inductor current of the transformer freewheeling. The current inside the bridge synchronous rectification circuit 311 flows through the fourth switch $Q_4$, the second resonant inductor Lm, the first resonant inductor Lr, the first resonant capacitor Cr, and the first switch $Q_1$. In this condition, the energy is continuously transmitted to the secondary side of the transformer.

Figure 6B:
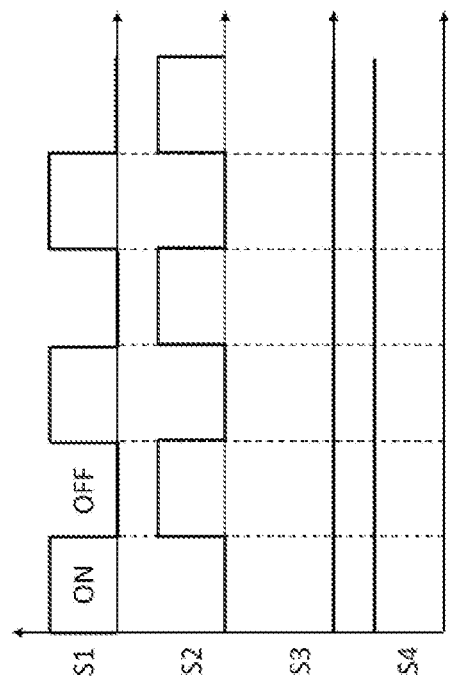
FIG. 6B is a schematic waveform of operating the asymmetric conversion circuit under the flyback conversion operation in the half-bridge resonant mode according to a second embodiment of the present disclosure.

Please refer to FIG. 6, which shows a schematic waveform of operating the asymmetric conversion circuit under the flyback conversion operation in the half-bridge resonant mode according to a second embodiment of the present disclosure, and also refer to FIG. 3. Under this operation, the fourth switch $Q_4$ is first turned on, and then the third switch $Q_3$ is switched on to be complemently switched, and the first switch $Q_1$ is turned on (high level) and the second switch $Q_2$ is turned off (low level), and the operation is continuously repeated to form a flyback conversion operation. Specifically, when the first switch $Q_1$ and the fourth switch $Q_4$ are first turned on, a current inside the bridge synchronous rectification circuit 311 flows through the first switch $Q_1$, the first resonant capacitor Cr, the first resonant inductor Lr, the second resonant inductor Lm, and the fourth switch $Q_4$. In this condition, energy is stored in the transformer (at the primary side) of the power converter.

Afterward, the first switch $Q_1$ and the third switch $Q_3$ are then turned on to keep the inductor current of the transformer freewheeling. The current inside the bridge synchronous rectification circuit 311 flows through the first switch $Q_1$, the first resonant capacitor Cr, the first resonant inductor Lr, the second resonant inductor Lm, and the third switch $Q_3$. In this condition, the energy is still stored in the transformer (at the primary side) of the power converter.

Afterward, the resonance operation of the resonant components is executed to implement zero-voltage switching (ZVS) and/or zero-current switching (ZCS). Therefore, under the turning on of the first switch $Q_1$ and the third switch $Q_3$, the formed sine wave flows through the third switch $Q_3$, the second resonant inductor Lm, the first resonant inductor Lr, the first resonant capacitor Cr, and the first switch $Q_1$. In this condition, the energy stored in the transformer is transmitted to the secondary side of the transformer.

Afterward, the first switch $Q_1$ and the fourth switch $Q_4$ are then turned on to keep the inductor current of the transformer freewheeling. The current inside the bridge synchronous rectification circuit 311 flows through the fourth switch $Q_4$, the second resonant inductor Lm, the first resonant inductor Lr, the first resonant capacitor Cr, and the first switch $Q_1$. In this condition, the energy is continuously transmitted to the secondary side of the transformer.

Figure 7B:
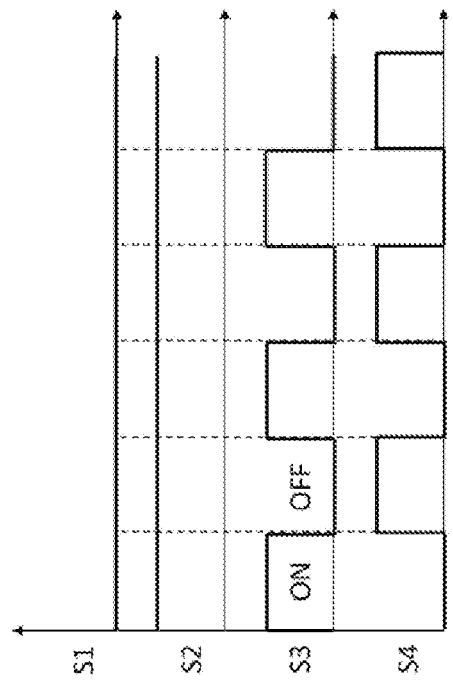
FIG. 7B is a schematic waveform of operating the asymmetric conversion circuit under the forward conversion operation in the half-bridge resonant mode according to a second embodiment of the present disclosure.
Figure 7A:
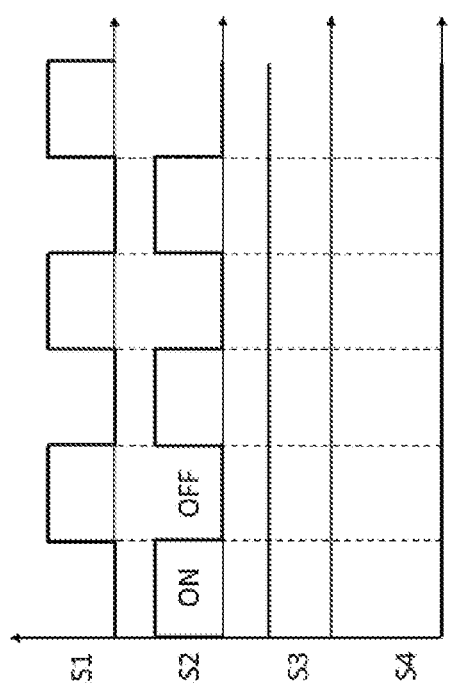
FIG. 7A is a schematic waveform of operating the asymmetric conversion circuit under the forward conversion operation in the half-bridge resonant mode according to a first embodiment of the present disclosure.

Please refer to FIG. 7A, which shows a schematic waveform of operating the asymmetric conversion circuit under the forward conversion operation in the half-bridge resonant mode according to a first embodiment of the present disclosure, and also refer to FIG. 3. Under this operation, the second switch $Q_2$ is first turned on, and then the first switch $Q_1$ is switched on to be complemently switched, and the third switch $Q_3$ is turned on (high level) and the fourth switch $Q_4$ is turned off (low level), and the operation is continuously repeated to form a forward conversion operation. Specifically, when the second switch $Q_2$ and the third switch $Q_3$ are first turned on, a current inside the bridge synchronous rectification circuit 311 flows through the third switch $Q_3$, the second resonant inductor Lm, the first resonant inductor Lr, the first resonant capacitor Cr, and the second switch $Q_2$. In this condition, energy is transmitted to the secondary side of the transformer.

Afterward, the first switch $Q_1$ and the third switch $Q_3$ are then turned on to keep the inductor current of the transformer freewheeling. The current inside the bridge synchronous rectification circuit 311 flows through the third switch $Q_3$, the second resonant inductor Lm, the first resonant inductor Lr, the first resonant capacitor Cr, and the first switch $Q_1$. In this condition, the energy is continuously transmitted to the secondary side of the transformer.

Afterward, the resonance operation of the resonant components is executed to implement zero-voltage switching (ZVS) and/or zero-current switching (ZCS). Therefore, under the turning on of the first switch $Q_1$ and the third switch $Q_3$, the formed sine wave flows through the first switch $Q_1$, the first resonant capacitor Cr, the first resonant inductor Lr, the second resonant inductor Lm, and the third switch $Q_3$. In this condition, the energy is stored in the transformer (at the primary side) of the power converter.

Afterward, the second switch $Q_2$ and the third switch $Q_3$ are then turned on to keep the inductor current of the transformer freewheeling. The current inside the bridge synchronous rectification circuit 311 flows through the second switch $Q_2$, the first resonant capacitor Cr, the first resonant inductor Lr, the second resonant inductor Lm, and the third switch $Q_3$. In this condition, the energy is still stored in the transformer (at the primary side) of the power converter.

Please refer to FIG. 7B, which shows a schematic waveform of operating the asymmetric conversion circuit under the forward conversion operation in the half-bridge resonant mode according to a second embodiment of the present disclosure, and also refer to FIG. 3. Under this operation, the third switch $Q_3$ is first turned on, and then the fourth switch $Q_4$ is switched on to be complemently switched, and the second switch $Q_2$ is turned on and the first switch $Q_1$ is turned off, and the operation is continuously repeated to form a forward conversion operation. Specifically, when the second switch $Q_2$ and the third switch $Q_3$ are first turned on, a current inside the bridge synchronous rectification circuit 311 flows through the third switch $Q_3$, the second resonant inductor Lm, the first resonant inductor Lr, the first resonant capacitor Cr, and the second switch $Q_2$. In this condition, energy is transmitted to the secondary side of the transformer.

Afterward, the second switch $Q_2$ and the fourth switch $Q_4$ are then turned on to keep the inductor current of the transformer freewheeling. The current inside the bridge synchronous rectification circuit 311 flows through the fourth switch $Q_4$, the second resonant inductor Lm, the first resonant inductor Lr, the first resonant capacitor Cr, and the second switch $Q_2$. In this condition, the energy is continuously transmitted to the secondary side of the transformer.

Afterward, the resonance operation of the resonant components is executed to implement zero-voltage switching (ZVS) and/or zero-current switching (ZCS). Therefore, under the turning on of the second switch $Q_2$ and the fourth switch $Q_4$, the formed sine wave flows through the second switch $Q_2$, the first resonant capacitor Cr, the first resonant inductor Lr, the second resonant inductor Lm, and the fourth switch $Q_4$. In this condition, the energy is stored in the transformer (at the primary side) of the power converter.

Afterward, the second switch $Q_2$ and the third switch $Q_3$ are then turned on to keep the inductor current of the transformer freewheeling. The current inside the bridge synchronous rectification circuit 311 flows through the second switch $Q_2$, the first resonant capacitor Cr, the first resonant inductor Lr, the second resonant inductor Lm, and the third switch $Q_3$. In this condition, the energy is still stored in the transformer (at the primary side) of the power converter.

When the output voltage $V_O$ is less than the threshold voltage and the output current $I_O$ is greater than the threshold current, the asymmetric conversion circuit 3 operates in the hybrid half-bridge resonant mode. According to the feedback control signal $S_F$, in the hybrid half-bridge resonant mode, the feedback control circuit 4 controls the first switch $Q_1$ and the second switch $Q_2$ to be partially complementarily switched and partially complementarily turned on and turned off, and the third switch $Q_3$ and the fourth switch $Q_4$ to be correspondingly partially complementarily turned on and turned off and correspondingly partially complementarily switched to convert the power voltage $V_P$ into the output voltage $V_O$.

Figure 8A:
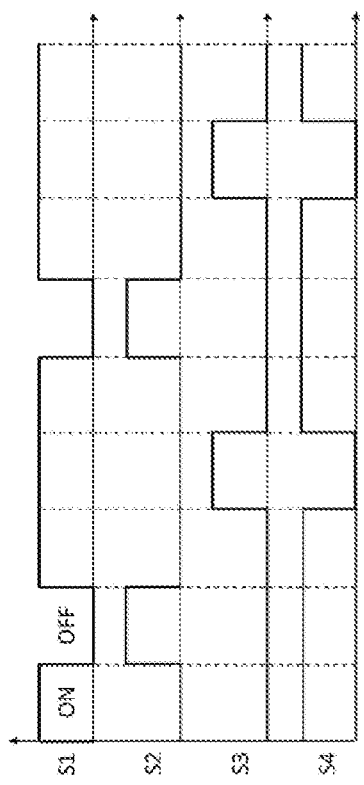
FIG. 8A is a schematic waveform of operating the asymmetric conversion circuit under the flyback conversion operation in a hybrid half-bridge resonant mode according to the present disclosure.

Please refer to FIG. 8A, which shows a schematic waveform of operating the asymmetric conversion circuit under the flyback conversion operation in a hybrid half-bridge resonant mode according to the present disclosure, and also refer to FIG. 3. Under this operation, the first switch $Q_1$ and the second switch $Q_2$ are first complementarily switched and then complementarily turned on and turned off, and the third switch $Q_3$ and the fourth switch $Q_4$ are correspondingly first complementarily turned on and turned off and then correspondingly complementarily switched, and the operation is continuously repeated to form a flyback conversion operation. Specifically, when the first switch $Q_1$ and the fourth switch $Q_4$ are first turned on, a current inside the bridge synchronous rectification circuit 311 flows through the first switch $Q_1$, the first resonant capacitor Cr, the first resonant inductor Lr, the second resonant inductor Lm, and the fourth switch $Q_4$. In this condition, energy is stored in the transformer (at the primary side) of the power converter.

Afterward, the second switch $Q_2$ and the fourth switch $Q_4$ are then turned on to keep the inductor current of the transformer freewheeling. The current inside the bridge synchronous rectification circuit 311 flows through the second switch $Q_2$, the first resonant capacitor Cr, the first resonant inductor Lr, the second resonant inductor Lm, and the fourth switch $Q_4$. In this condition, the energy is still stored in the transformer (at the primary side) of the power converter.

Afterward, the resonance operation of the resonant components is executed to implement zero-voltage switching (ZVS) and/or zero-current switching (ZCS). Therefore, under the turning on of the second switch $Q_2$ and the fourth switch $Q_4$, the formed sine wave flows through the fourth switch $Q_4$, the second resonant inductor Lm, the first resonant inductor Lr, the first resonant capacitor Cr, and the second switch $Q_2$. In this condition, the energy stored in the transformer is transmitted to the secondary side of the transformer.

Afterward, the first switch $Q_1$ and the fourth switch $Q_4$ are then turned on to keep the inductor current of the transformer freewheeling. The current inside the bridge synchronous rectification circuit 311 flows through the fourth switch $Q_4$, the second resonant inductor Lm, the first resonant inductor Lr, the first resonant capacitor Cr, and the first switch $Q_1$. In this condition, the energy is continuously transmitted to the secondary side of the transformer.

Afterward, the resonance operation of the resonant components is executed to implement zero-voltage switching (ZVS) and/or zero-current switching (ZCS). Therefore, under the turning on of the first switch $Q_1$ and the fourth switch $Q_4$, the formed sine wave flows through the first switch $Q_1$, the first resonant capacitor Cr, the first resonant inductor Lr, the second resonant inductor Lm, and the fourth switch $Q_4$. In this condition, energy is stored in the transformer (at the primary side) of the power converter.

Afterward, the first switch $Q_1$ and the third switch $Q_3$ are then turned on to keep the inductor current of the transformer freewheeling. The current inside the bridge synchronous rectification circuit 311 flows through the first switch $Q_1$, the first resonant capacitor Cr, the first resonant inductor Lr, the second resonant inductor Lm, and the third switch $Q_3$. In this condition, the energy is still stored in the transformer (at the primary side) of the power converter.

Afterward, the resonance operation of the resonant components is executed to implement zero-voltage switching (ZVS) and/or zero-current switching (ZCS). Therefore, under the turning on of the first switch $Q_1$ and the third switch $Q_3$, the formed sine wave flows through the third switch $Q_3$, the second resonant inductor Lm, the first resonant inductor Lr, the first resonant capacitor Cr, and the first switch $Q_1$. In this condition, the energy stored in the transformer is transmitted to the secondary side of the transformer.

Afterward, the first switch $Q_1$ and the fourth switch $Q_4$ are then turned on to keep the inductor current of the transformer freewheeling. The current inside the bridge synchronous rectification circuit 311 flows through the fourth switch $Q_4$, the second resonant inductor Lm, the first resonant inductor Lr, the first resonant capacitor Cr, and the first switch $Q_1$. In this condition, the energy is continuously transmitted to the secondary side of the transformer.

Figure 8B:
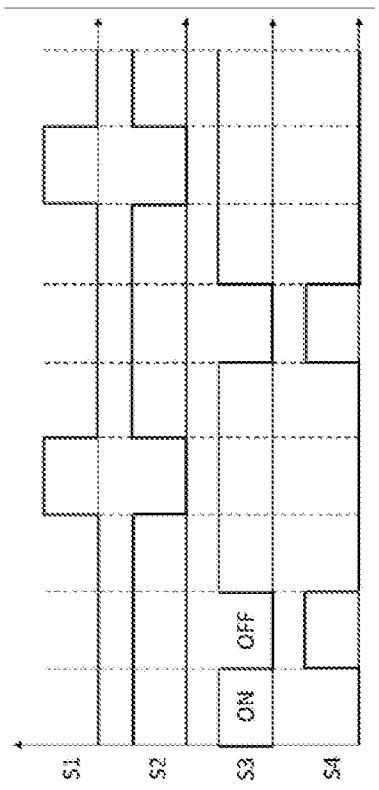
FIG. 8B is a schematic waveform of operating the asymmetric conversion circuit under the forward conversion operation in the hybrid half-bridge resonant mode according to the present disclosure.

Please refer to FIG. 8B, which shows a schematic waveform of operating the asymmetric conversion circuit under the forward conversion operation in the hybrid half-bridge resonant mode according to the present disclosure, and also refer to FIG. 3. Under this operation, the third switch $Q_3$ and the fourth switch $Q_4$ are first complementarily switched and then complementarily turned on and turned off, and the first switch $Q_1$ and the second switch $Q_2$ are correspondingly first complementarily turned on and turned off and then correspondingly complemently switched, and the operation is continuously repeated to form a forward conversion operation. Specifically, when the second switch $Q_2$ and the third switch $Q_3$ are first turned on, a current inside the bridge synchronous rectification circuit 311 flows through the third switch $Q_3$, the second resonant inductor Lm, the first resonant inductor Lr, the first resonant capacitor Cr, and the second switch $Q_2$. In this condition, the energy stored in the transformer is transmitted to the secondary side of the transformer.

Afterward, the first switch $Q_1$ and the third switch $Q_3$ are then turned on to keep the inductor current of the transformer freewheeling. The current inside the bridge synchronous rectification circuit 311 flows through the third switch $Q_3$, the second resonant inductor Lm, the first resonant inductor Lr, the first resonant capacitor Cr, and the first switch $Q_1$. In this condition, the energy is continuously transmitted to the secondary side of the transformer.

Afterward, the resonance operation of the resonant components is executed to implement zero-voltage switching (ZVS) and/or zero-current switching (ZCS). Therefore, under the turning on of the first switch $Q_1$ and the third switch $Q_3$, the formed sine wave flows through the first switch $Q_1$, the first resonant capacitor Cr, the first resonant inductor Lr, the second resonant inductor Lm, and the third switch $Q_3$. In this condition, the energy is stored in the transformer (at the primary side) of the power converter.

Afterward, the second switch $Q_2$ and the third switch $Q_3$ are then turned on to keep the inductor current of the transformer freewheeling. The current inside the bridge synchronous rectification circuit 311 flows through the second switch $Q_2$, the first resonant capacitor Cr, the first resonant inductor Lr, the second resonant inductor Lm, and the third switch $Q_3$. In this condition, the energy is still stored in the transformer (at the primary side) of the power converter.

Afterward, the resonance operation of the resonant components is executed to implement zero-voltage switching (ZVS) and/or zero-current switching (ZCS). Therefore, under the turning on of the second switch $Q_2$ and the third switch $Q_3$, the formed sine wave flows through the third switch $Q_3$, the second resonant inductor Lm, the first resonant inductor Lr, the first resonant capacitor Cr, and the second switch $Q_2$. In this condition, the energy stored in the transformer is transmitted to the secondary side of the transformer.

Afterward, the second switch $Q_2$ and the fourth switch $Q_4$ are then turned on to keep the inductor current of the transformer freewheeling. The current inside the bridge synchronous rectification circuit 311 flows through the fourth switch $Q_4$, the second resonant inductor Lm, the first resonant inductor Lr, the first resonant capacitor Cr, and the second switch $Q_2$. In this condition, the energy is continuously transmitted to the secondary side of the transformer.

Afterward, the resonance operation of the resonant components is executed to implement zero-voltage switching (ZVS) and/or zero-current switching (ZCS). Therefore, under the turning on of the second switch $Q_2$ and the fourth switch $Q_4$, the formed sine wave flows through the second switch $Q_2$, the first resonant capacitor Cr, the first resonant inductor Lr, the second resonant inductor Lm, and the fourth switch $Q_4$. In this condition, the energy is stored in the transformer (at the primary side) of the power converter.

Afterward, the second switch $Q_2$ and the third switch $Q_3$ are then turned on to keep the inductor current of the transformer freewheeling. The current inside the bridge synchronous rectification circuit 311 flows through the second switch $Q_2$, the first resonant capacitor Cr, the first resonant inductor Lr, the second resonant inductor Lm, and the third switch $Q_3$. In this condition, the energy is still stored in the transformer (at the primary side) of the power converter.

In summary, the present disclosure has the following features and advantages:

1. According to the output voltage and output current, the feedback control circuit controls the asymmetric conversion circuit to operate in the full-bridge resonant mode, the half-bridge resonant mode, or the hybrid half-bridge resonant mode according to the feedback control signal.
2. By operating in the different operation modes achieves the required voltage gain ratio, and the conversion between high wattage and low wattage requirements, thereby increasing the operation cycle range.
3. The full-bridge mode is used at higher wattages, and the half-bridge mode is used at lower wattages to reduce switching losses at lower wattages.
4. Uniform distribution of switching losses can be implemented by operating the asymmetric conversion circuit in the half-bridge resonant mode and the hybrid half-bridge resonant mode.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An asymmetric power converter, comprising:
    a primary-side rectifying/filtering circuit, configured to receive an input voltage, and rectify and filter the input voltage into a first voltage,
    a power factor correction circuit, configured to receive the first voltage, and convert the first voltage into a power voltage,
    an asymmetric conversion circuit, configured to receive the power voltage, and convert the power voltage into an output voltage to supply power to a load, and an output current being drawn by the load,
    a feedback control circuit, coupled to the asymmetric conversion circuit, and configured to generate a feedback control signal according to a load power demand provided by the load, wherein the load power demand comprises information of the output voltage and information of the output current,
    wherein the feedback control circuit controls the asymmetric conversion circuit to operate in a full-bridge resonant mode, a half-bridge resonant mode, or a hybrid half-bridge resonant mode according to the feedback control signal.

2. The asymmetric power converter as claimed in claim 1, wherein the power factor correction circuit comprises:
    a first switch, a first end of the first switch coupled to a first end of the first voltage,
    a first inductor, a first end of the first inductor coupled to a second end of the first switch, and a second end of the first inductor coupled to a second end of the first voltage,
    a first diode, a first end of the first diode coupled to the first end of the first inductor, a first capacitor, a first end of the first capacitor coupled to a second end of the first diode, and a second end of the first capacitor coupled to the second end of the first inductor, and a first resistor, a first end of the first resistor coupled to the first end of the first capacitor, and a second end of the first resistor coupled to the second end of the first capacitor, wherein the first switch is controlled to switching according to the switching frequency so as to convert the first voltage into the power voltage.

3. The asymmetric power converter as claimed in claim 1, wherein the power factor correction circuit comprises:

a first inductor, a first end of the first inductor coupled to a first end of the first voltage, a first switch, a first end of the first switch coupled to a second end of the first inductor, and a second end of the first switch coupled to a second end of the first voltage, a first diode, a first end of the first diode coupled to the first end of the first switch, a first capacitor, a first end of the first capacitor coupled to a second end of the first diode, and a second end of the first capacitor coupled to the second end of the first switch, and a first resistor, a first end of the first resistor coupled to the first end of the first capacitor, and a second end of the first resistor coupled to the second end of the first capacitor, wherein the first switch is controlled to switching according to the switching frequency so as to convert the first voltage into the power voltage.

4. The asymmetric power converter as claimed in claim 1, wherein the asymmetric conversion circuit comprises:

a primary-side isolation circuit, configured to receive the feedback control signal and the power voltage, and a secondary-side isolation circuit, configured to convert the power voltage into the output voltage.

5. The asymmetric power converter as claimed in claim 4, wherein the primary-side isolation circuit comprises a bridge synchronous rectification circuit; the secondary-side isolation circuit comprises a bridge switching circuit and a resonant circuit.

6. The asymmetric power converter as claimed in claim 5, wherein the bridge synchronous rectification circuit comprises:

a first switch, a second switch, a first end of the second switch coupled to a second end of the first switch, a third switch, a first end of the third switch coupled to a first end of the first switch, a fourth switch, a first end of the fourth switch coupled to a second end of the third switch, and a second end of the fourth switch coupled to a second end of the second switch, a first resonant inductor, a first resonant capacitor, coupled to the first resonant inductor in series to form a series-connected branch, and a first end of the series-connected branch coupled to the second end of the first switch and the first end of the second switch, and a second resonant inductor, a first end of the second resonant inductor coupled to a second end of the series-connected branch, and a second end of the second resonant inductor coupled to the second end of the third switch and the first end of the fourth switch, wherein the feedback control circuit controls the first switch, the second switch, the third switch, and the fourth switch according to the feedback control signal.

7. The asymmetric power converter as claimed in claim 6, wherein when the output voltage is greater than a threshold voltage, the asymmetric conversion circuit operates in the full-bridge resonant mode, wherein the first switch and the fourth switch are simultaneously turned on or turned off, the second switch and the third switch are simultaneously turned on or turned off, and the first switch and the second switch are complementy switched so as to convert the power voltage into the output voltage.

8. The asymmetric power converter as claimed in claim 7, wherein the first switch and the fourth switch are first turned on, and then the second switch and the third switch are turned on, and the operation is continuously repeated to form a flyback conversion operation.

9. The asymmetric power converter as claimed in claim 7, wherein the second switch and the third switch are first turned on, and then the first switch and the fourth switch are turned on, and the operation is continuously repeated to form a forward conversion operation.

10. The asymmetric power converter as claimed in claim 6, wherein when the output voltage is less than a threshold voltage and the output current is less than a threshold current, the asymmetric conversion circuit operates in the half-bridge resonant mode, wherein the first switch and the second switch are complemently switched, and the third switch and the fourth switch are complemently turned on and turned off so as to convert the power voltage into the output voltage; or the first switch and the second switch are complemently turned on and turned off, and the third switch and the fourth switch are complemently switched so as to convert the power voltage into the output voltage.

11. The asymmetric power converter as claimed in claim 10, wherein the first switch is first turned on, and then the second switch is switched on to be complemently switched, and the third switch is turned on and the fourth switch is turned off, and the operation is continuously repeated to form a flyback conversion operation.

12. The asymmetric power converter as claimed in claim 10, wherein the fourth switch is first turned on, and then the third switch is switched on to be complemently switched, and the first switch is turned on and the second switch is turned off, and the operation is continuously repeated to form a flyback conversion operation.

13. The asymmetric power converter as claimed in claim 10, wherein the second switch is first turned on, and then the first switch is switched on to be complemently switched, and the third switch is turned on and the fourth switch is turned off, and the operation is continuously repeated to form a forward conversion operation.

14. The asymmetric power converter as claimed in claim 10, wherein the third switch is first turned on, and then the fourth switch is switched on to be complemently switched, and the second switch is turned on and the first switch is turned off, and the operation is continuously repeated to form a forward conversion operation.

15. The asymmetric power converter as claimed in claim 6, wherein when the output voltage is less than a threshold voltage and the output current is greater than a threshold current, the asymmetric conversion circuit operates in the hybrid half-bridge resonant mode, wherein the first switch and the second switch are partially complemently switched and partially complemently turned on and turned off, and the third switch and the fourth switch are correspondingly partially complemently turned on and turned off and correspondingly partially complemently switched to convert the power voltage into the output voltage.

16. The asymmetric power converter as claimed in claim 15, wherein the first switch and the second switch are first complemently switched and then complemently turned on and turned off, and the third switch and the fourth switch are correspondingly first complemently turned on and turned off and then correspondingly complemently switched, and the operation is continuously repeated to form a flyback conversion operation.

17. The asymmetric power converter as claimed in claim 15, wherein the third switch and the fourth switch are first complemently switched and then complemently turned on and turned off, and the first switch and the second switch are correspondingly first complemently turned on and turned off and then correspondingly complemently switched, and the operation is continuously repeated to form a forward conversion operation.

18. The asymmetric power converter as claimed in claim 5, wherein the bridge switching circuit comprises an upper switch; the resonant circuit comprises a capacitor and a resistor to form a parallel-connected branch, and the parallel-connected branch is coupled to the upper switch.

* * * * *